United States Patent
John et al.

(10) Patent No.: US 10,563,597 B2
(45) Date of Patent: Feb. 18, 2020

(54) FUEL INJECTOR

(71) Applicant: Caterpillar Inc., Peoria, IL (US)

(72) Inventors: Bobby John, Peoria, IL (US); Glen Clifford Martin, Peoria, IL (US); Jonathan W. Anders, Peoria, IL (US); Robert M. Campion, Chillicothe, IL (US)

(73) Assignee: Caterpillar Inc., Peoria, IL (US)

( * ) Notice: Subject to any disclaimer, the term of this patent is extended or adjusted under 35 U.S.C. 154(b) by 161 days.

(21) Appl. No.: 15/814,918

(22) Filed: Nov. 16, 2017

(65) Prior Publication Data

US 2019/0145339 A1 May 16, 2019

(51) Int. Cl.
| | | |
|---|---|---|
| *F02D 19/06* | (2006.01) | |
| *F02M 45/08* | (2006.01) | |
| *F02M 61/18* | (2006.01) | |
| *F02M 61/12* | (2006.01) | |
| *F02D 41/40* | (2006.01) | |
| *F02D 19/08* | (2006.01) | |
| *F02D 41/00* | (2006.01) | |

(52) U.S. Cl.
CPC ....... *F02D 19/0694* (2013.01); *F02D 19/081* (2013.01); *F02D 41/40* (2013.01); *F02M 45/086* (2013.01); *F02M 61/12* (2013.01); *F02M 61/1806* (2013.01); *F02D 41/0025* (2013.01); *F02M 2200/46* (2013.01)

(58) Field of Classification Search
CPC ................ F02M 2200/46; F02M 61/1866
See application file for complete search history.

(56) References Cited

U.S. PATENT DOCUMENTS

| | | | |
|---|---|---|---|
| 1,834,061 A * | 12/1931 | Joachim | ............... F02M 45/086 |
| | | | 239/410 |
| 4,546,739 A | 10/1985 | Nakajima et al. | |
| 5,899,385 A | 5/1999 | Hofmann et al. | |
| 6,024,297 A | 2/2000 | Greeves | |
| 6,467,702 B1 | 10/2002 | Lambert et al. | |
| 9,068,539 B2 * | 6/2015 | Coldren | ............. F02D 19/0694 |
| 9,261,049 B2 * | 2/2016 | Huettner | ............ F02M 63/0015 |

FOREIGN PATENT DOCUMENTS

| | | |
|---|---|---|
| DE | 10319980 | 8/2004 |
| DE | 102004021538 | 12/2005 |
| EP | 3159531 | 4/2017 |

OTHER PUBLICATIONS

Perras, DE 10319980, machine translation (Year: 2004).*
Boecking, DE 102004021538, machine translation (Year: 2005).*

* cited by examiner

*Primary Examiner* — Hung Q Nguyen
*Assistant Examiner* — Mark L. Greene
(74) *Attorney, Agent, or Firm* — Oblon, McClelland, Maier & Neustadt (57) ABSTRACT

A fuel injector includes a nozzle having at least one first orifice provided therein. The at least one first orifice is adapted to selectively inject one of a fuel and an oxidant. An outer check is disposed movably within the nozzle. The outer check includes at least one second orifice provided therein. The at least one second orifice is adapted to selectively inject an other of the oxidant and the fuel. An inner check is disposed movably and concentrically within the outer chock. The at least one second orifice is adapted to align with respect to the at least one first orifice to selectively inject the fuel and the oxidant together through the at least one first orifice based on a position of each of the outer check and the inner check.

18 Claims, 7 Drawing Sheets

FUEL INJECTOR

TECHNICAL FIELD

The present disclosure relates to a fuel injector. More specifically, the present disclosure relates to a fuel injector for an internal combustion engine.

BACKGROUND

An internal combustion engine typically combusts a mixture of a fuel and an oxidant such as air, to produce mechanical power. Introduction of the fuel into a cylinder of the internal combustion engine is most commonly achieved using a fuel injector. A commonly used injector is a closed-nozzle injector which includes a nozzle assembly having a spring-biased needle valve element positioned adjacent an injector nozzle for allowing the fuel to be injected into the cylinder of the internal combustion engine. The needle valve element moves to allow the fuel to pass through the injector nozzle and out of injector orifices or spray holes, thus, marking the beginning of a fuel injection event.

The fuel supplied by the injector comes in contact with pressurized oxidant, and gets ignited. For an efficient combustion process to occur, efficient mixing of the fuel with the oxidant is necessary. The oxidant may be typically introduced in the combustion chamber through an inlet port, which may be coupled to a source of oxidant. However, in such an arrangement, the fuel comes into contact with the oxidant after the fuel is injected into the combustion chamber resulting in inadequate mixing of the fuel and the oxidant. As the fuel starts burning in a very short span of time after being injected, there is a need for an improved mixing of the fuel and the oxidant.

German Patent Application Number DL 10200/4021538 describes a fluid flow control valve. The fluid flow control valve includes two coaxial valve needles. An inner needle is completely enclosed inside an outer needle. Flow of fuel to jets in the outer needle is blocked by the inner needle. Large diameter jets in the hollow conical nozzle body are provided in line with the jets in the outer needle. The outer needle blocks additional flow to jets in a conical nozzle. The inner and the outer needles together provide a set of injection openings to inject fuel into the combustion chamber.

SUMMARY

In an aspect of the present disclosure, a fuel injector is provided. The fuel injector includes a nozzle having at least one first orifice. The at least one first orifice selectively injects one of a fuel and an oxidant. The fuel injector includes an outer check disposed movably within the nozzle. The outer check includes at least one second orifice. The at least one second orifice selectively injects an other of the oxidant and the fuel. The fuel injector further includes an inner check disposed movably and concentrically within the outer check. The at least one second orifice aligns with respect to the at least one first orifice to selectively inject the fuel and the oxidant together through the at least one first orifice based on a position of each of the outer check and the inner check.

In another aspect of the present disclosure, a fuel injection system is provided. The fuel injection system includes a fuel source which provides a fuel. The fuel injection system includes an oxidant source which provides an oxidant. The fuel injection system includes a fuel injector provided in fluid communication with each of the fuel source and the oxidant source. The fuel injector includes a nozzle including at least one first orifice. The at least one first orifice selectively injects one of the fuel and the oxidant. The fuel injector includes an outer check disposed movably within the nozzle. The outer chock includes at least one second orifice. The at least one second orifice selectively injects an other of the oxidant and the fuel. The fuel injector further includes an inner check disposed movably and concentrically within the outer check. The fuel injection system further includes a controller in communication with each of the fuel source, the oxidant source, and the fuel injector.

In yet another aspect of the present disclosure, a method for controlling a fuel injector is provided. The fuel injector includes a nozzle, an outer check, and an inner check. The method includes providing flow of a fuel to the fuel injector. The method includes providing flow of an oxidant to the fuel injector. The method includes controlling a position of the outer check. The method includes injecting one of the fuel and the oxidant through at least one first orifice. The method includes controlling a position of the inner check. The method includes injecting an other of the oxidant and the fuel through at least one second orifice. The method further includes injecting the fuel and the oxidant together through the at least one first orifice.

DETAILED DESCRIPTION

Figure 1:
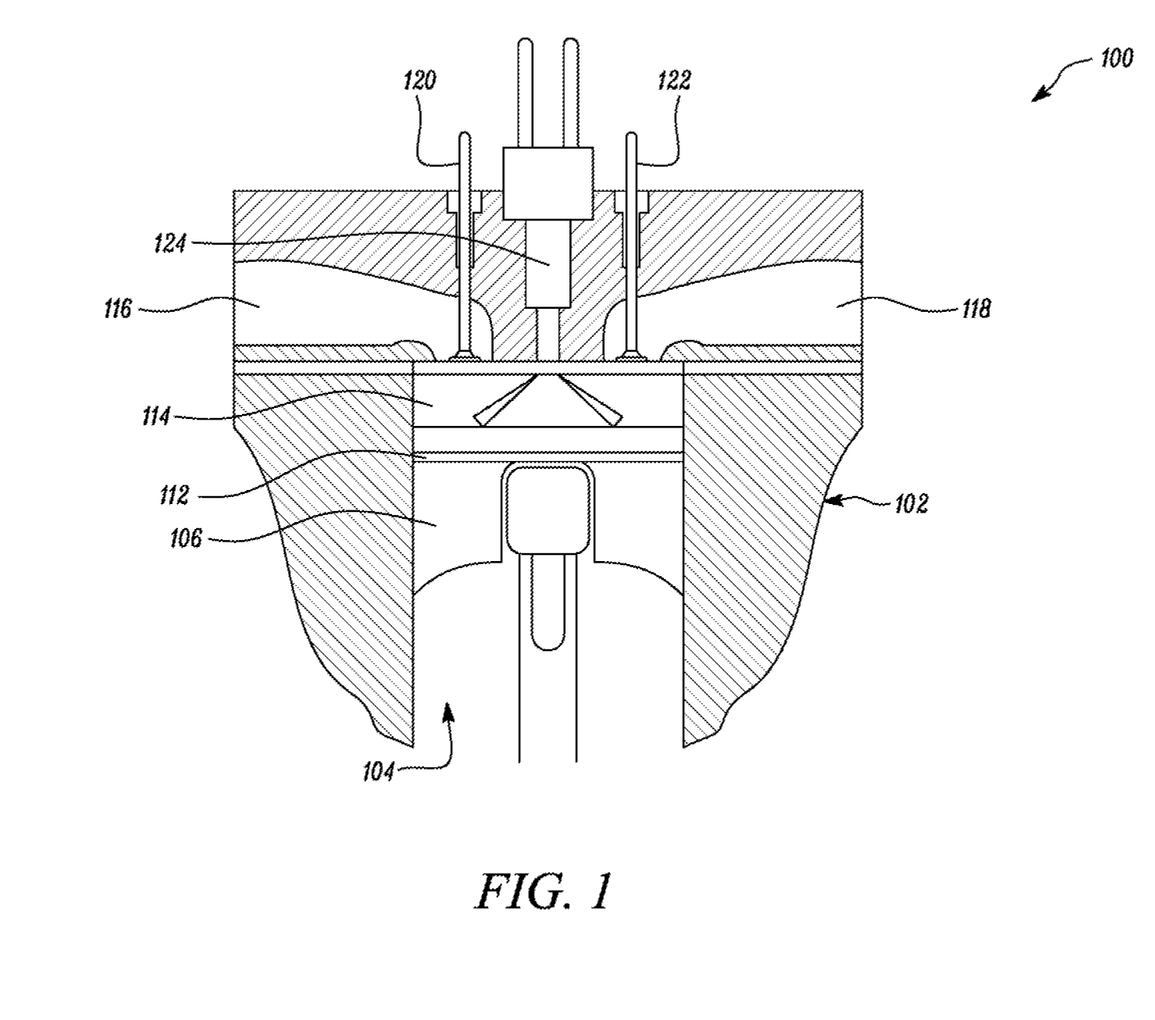
FIG. 1 illustrates an exemplary engine, in accordance with an embodiment of the present disclosure.

Wherever possible, the same reference numbers will be used throughout the drawings to refer to same or like parts. FIG. 1 illustrates an exemplary engine 100. The engine 100 is an internal combustion engine powered by any fuel known in the art, such as natural gas, diesel, or gasoline. In some embodiments, the engine 100 may be associated with a machine (not shown) including, but not limited to, a locomotive, a marine vessel, a land vehicle, and a power generator. The engine 100 and/or the machine may be employed in any industry including, but not limited to, construction, agriculture, forestry, mining, transportation, waste management, aviation, marine, material handling, and power generation.

The engine 100 includes an engine block 102. The engine block 102 defines a cylinder 104 within the engine block 102. It should be contemplated that only one cylinder 104 is illustrated for sake of clarity, and explanation. There may be any number of cylinders 104 provided with the engine 100 based on operational requirements of the engine 100. The cylinder 104 includes a piston 106 adapted to slide inside the cylinder 104 between a top dead, center and a bottom dead center. The piston 106 is provided with piston rings 112 to prevent leakage of any gases from between the piston 106 and the cylinder 104. The cylinder 104 and the piston 106 together define a combustion chamber 114 for combusting a mixture of a fuel and an oxidant therein.

The combustion chamber 114 is coupled to each of an intake manifold 116 and an exhaust manifold 118 through an inlet valve 120 and an outlet valve 122 respectively. The inlet valve 120 allows inlet of the oxidant through the intake manifold 116 inside the combustion chamber 114. The oxidant is compressed inside the combustion chamber 114. The combustion chamber 114 is also provided with the fuel through a fuel injector 124. The fuel injector 124 is adapted to supply one or more of the fuel and the oxidant into the combustion chamber 114. Additionally, the engine 100 may include various other components and/or systems (not shown) including, but not limited to, a crankcase, a fuel system, an air system, a cooling system, a lubrication system, a turbocharger, an exhaust gas recirculation system, and peripheries, among others.

Figure 2:
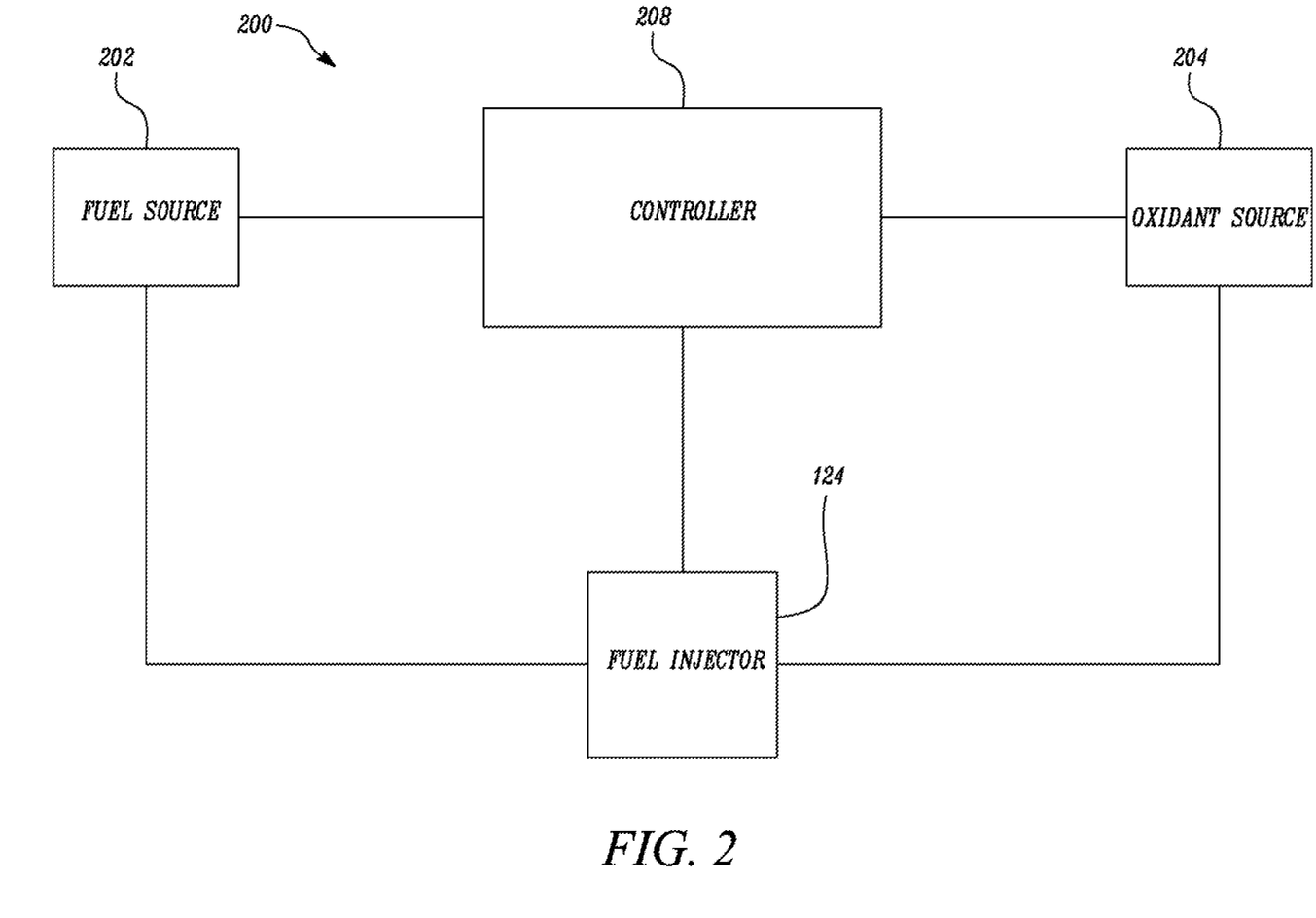
FIG. 2 schematically illustrates a fuel injection system for the engine of FIG. 1, in accordance with an embodiment of the present disclosure.

FIG. 2 shows a block diagram representing a fuel injection system 200 for the engine 100. The fuel injection system 200 includes a fuel source 202. In one embodiment, the fuel source 202 may be a source of liquid fuel or gaseous fuel, such as diesel fuel, a gasoline fuel, alcohol, natural gas, and so on. The fuel source 202 is configured to store the fuel, and supply the fuel to the engine 100 as per operational requirements of the engine 100. The fuel source 202 may be a fuel tank, a reservoir, etc., which may store the fuel, and may include associated parts and components required to supply the fuel to the engine 100.

The fuel injection system 200 includes an oxidant source 204. In one embodiment, the oxidant may be air. In another embodiment, the oxidant may be oxygen. In another embodiment, the oxidant may be an oxidizer, such as nitrous oxide. In yet another embodiment, the oxidant may be a combination of one or more of air, oxygen and the oxidizer. In yet another embodiment, the oxidant may be intake air that could be drawn from the intake manifold 116 and compressed in the fuel injector 124, or compressed by a separate pump (not shown) and drawn into the fuel injector 124. The temperature of the oxidant may be controlled, and the pressure of the oxidant may be sufficient to overcome cylinder pressure at time of injection. The oxidant is configured to support combustion of the fuel within the cylinder 104. The oxidant source 204 is configured to store the oxidant, and supply the oxidant to the engine 100, based on application requirements. The oxidant source 204 may be a storage tank, a reservoir, etc., which may store the oxidant, and may include associated parts and components required to supply the oxidant to the engine 100.

The fuel injection system 200 includes a controller 208. The controller 208 may be a single controller, or a group of multiple controllers configured to control various aspects of operation of the engine 100. The controller 208 may be a microprocessor, a field programmable gate array (FPGA), or any other such component which may perform functions intended of a controller. The controller 208 is communicably coupled to the fuel source 202 and the oxidant source 204.

The controller 208 may control supply of the fuel and the oxidant from the fuel source 202 and the oxidant source 204 respectively, so as to provide an appropriate blend of the fuel and the oxidant to be supplied to the engine 100.

The fuel injection system 200 further includes the fuel injector 124 to inject the fuel and the oxidant together into the cylinder 104. The fuel injector 124 is communicably coupled with the controller 208 such that the controller 208 may control operation of the fuel injector 124. The fuel injector 124 is also coupled with the fuel source 202 and the oxidant source 204 such that the fuel source 202 and the oxidant source 204 supply the fuel and the oxidant respectively to the fuel injector 124. The controller 208 may control supply of the fuel and the oxidant from the fuel source 202 and the oxidant source 204 respectively to the fuel injector 124 as required.

Figure 3:
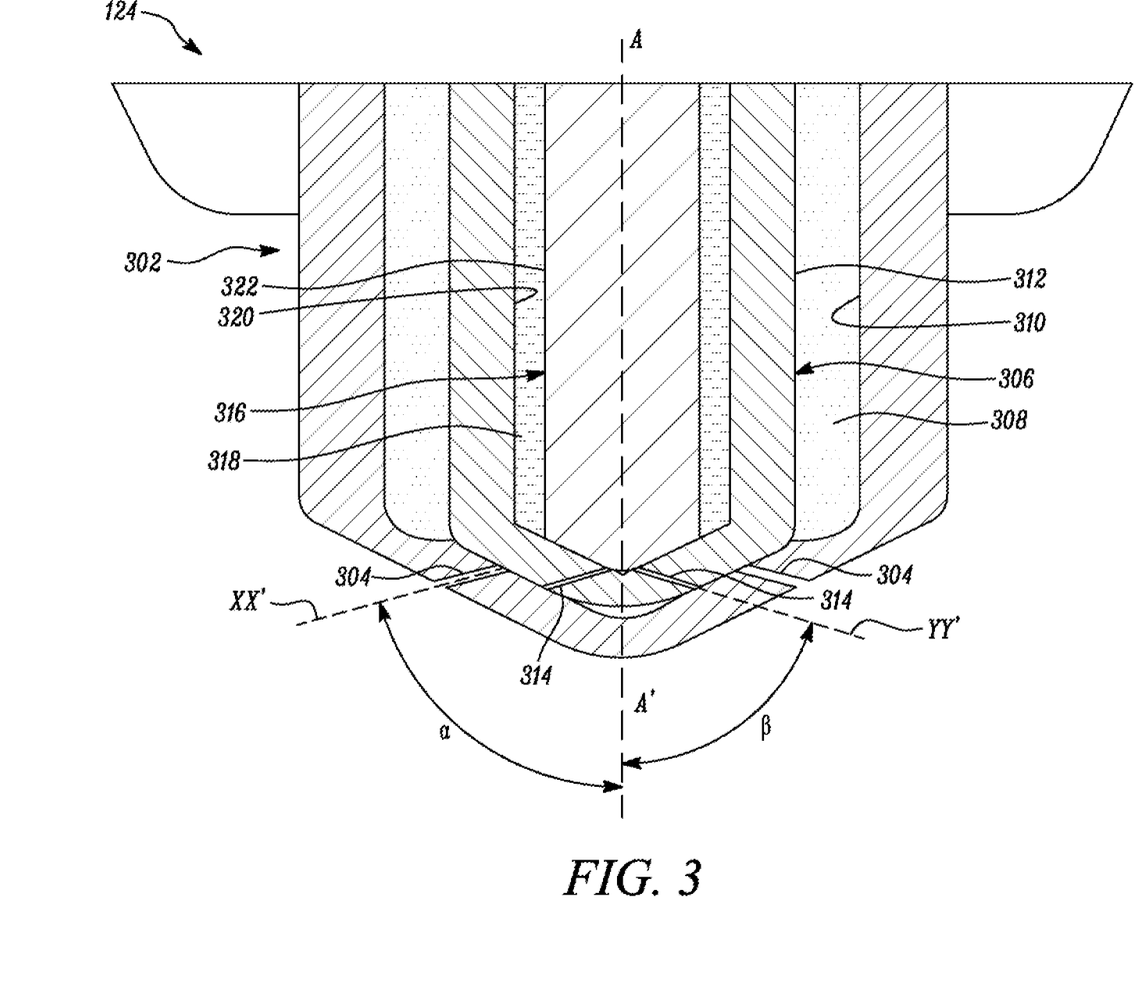
FIG. 3 illustrates a partial sectional view of an injector showing an outer check and an inner check in closed positions, in accordance with an embodiment of the present disclosure.

FIG. 3 shows a partial sectional view of the fuel injector 124. The fuel injector 124 includes a nozzle 302. The nozzle 302 has a substantially cylindrical structure, which tapers towards an end to form a substantially conical structure. The nozzle 302 defines at least one first orifice 304 within the conical structure. In the illustrated embodiment, the nozzle 302 includes two first orifices 304. It should be contemplated that the nozzle 302 may include any number of first orifices 304, based on application requirements.

The first orifice 304 may be an opening, or a hole defined within the nozzle 302 to allow flow of a fluid through the nozzle 302 along a first spray axis X-X'. More specifically, the first orifice 304 may allow flow of the fuel or the oxidant through the nozzle 302. A central axis A-A' passes symmetrically through the fuel injector 124. The first orifices 304 are defined by the nozzle 302 symmetrically about the axis A-A'. The first orifices 304 define a first included angle "α" with respect to the axis A-A'. The first included angle "α" may also be defined as an angle included between the first spray axis X-X' and the central axis A-A'. The first included angle "α" is same for both the first orifices 304. In some embodiments, when there may be more than two first orifices 304, all the first orifices 304 may be provided at similar respective included angles.

Figure 4:
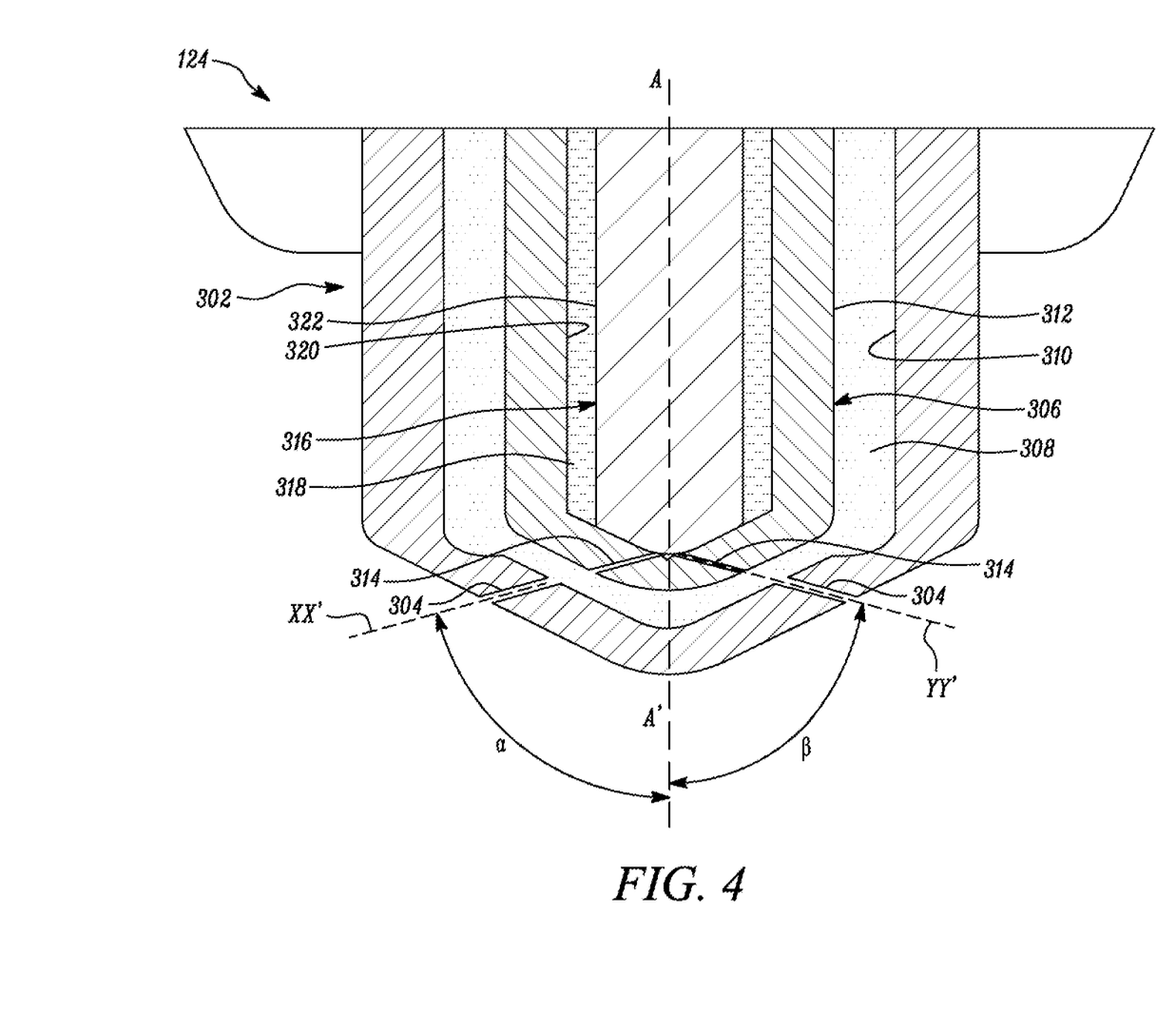
FIG. 4 illustrates a partial sectional view of the injector showing the outer check in open position and the inner check in closed position, in accordance with an embodiment of the present disclosure.
Figure 5:
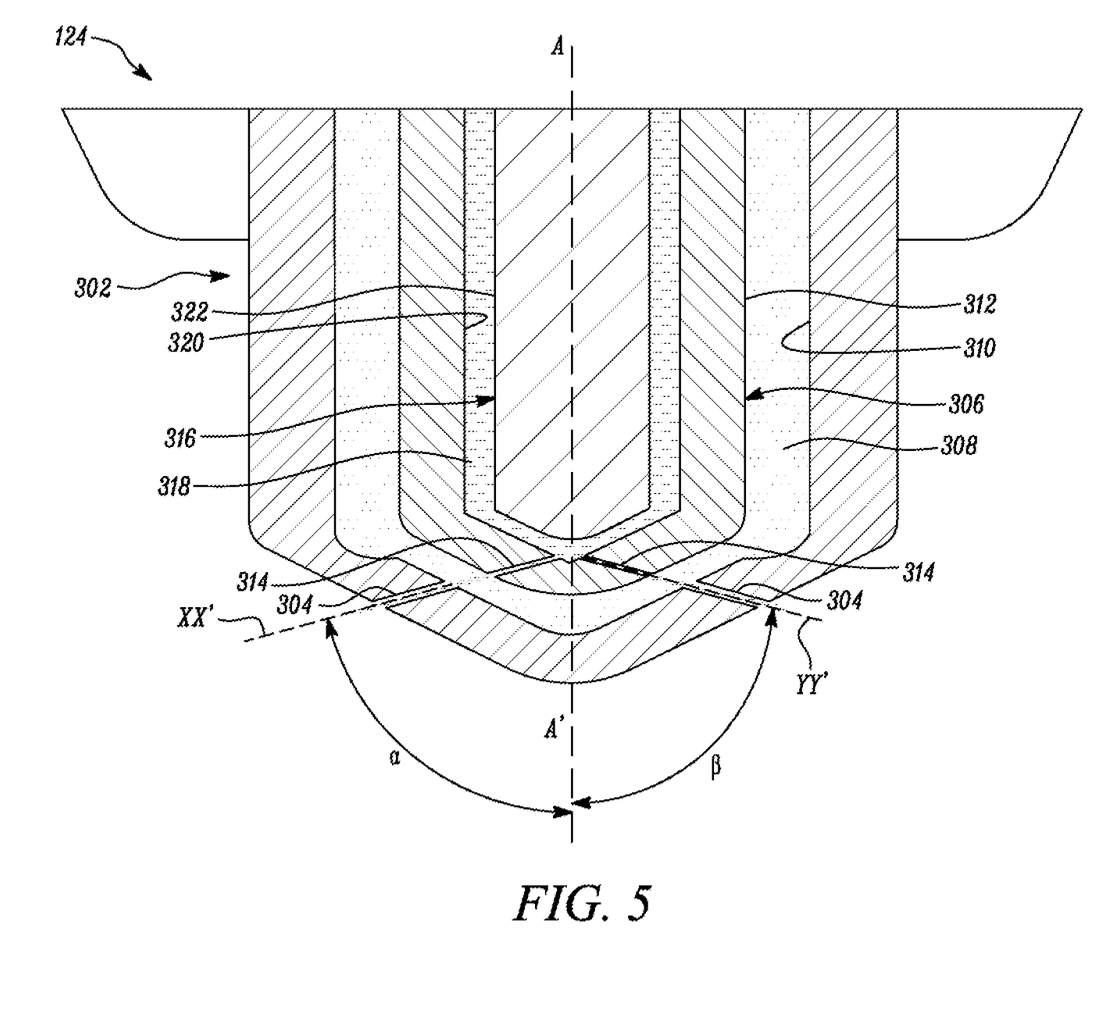
FIG. 5 illustrates a partial sectional view of the injector showing the outer check in open position and the inner check in open position, in accordance with an embodiment of the present disclosure.

The nozzle 302 has a hollow structure. The fuel injector 124 includes an outer check 306 disposed movably within the nozzle 302 along the axis A-A'. The outer check 306 is provided within the nozzle 302 such that the outer check 306 may translate along the axis A-A'. The outer check 306 may move between a closed position (as illustrated in FIG. 3) and an open position (as illustrated in FIGS. 4 and 5).

The controller 208 may be operatively coupled with the fuel injector 124 such that the controller 208 may control the movement of the outer check 306 within the nozzle 302 between the open position and the closed position. The outer check 306 and the nozzle 302 define a first passage 308 disposed concentrically between the outer check 306 and the nozzle 302. The first passage 308 may be coupled to one of the fuel source 202 and the oxidant source 204, and one of the fuel or the oxidant respectively may be supplied through the first passage 308. More specifically, the first passage 308 is defined between an inner surface 310 of the nozzle 302, and an outer surface 312 of the outer check 306.

The outer check 306 has a substantially cylindrical structure, which tapers towards an end to form a substantially conical structure. The outer check 306 defines at least one second orifice 314 within the conical structure. In the illustrated embodiment, the outer check 306 includes two second orifices 314 along a second spray axis Y-Y'. It should be contemplated that the outer check 306 may include any number of second orifices 314, based on application requirements. The second orifice 314 is an opening, or a hole defined by the outer check 306 to allow flow of a fluid through the outer check 306. More specifically, the second orifice 314 may allow flow of the other of the fuel or the oxidant through the outer check 306. The second orifices 314 are defined by the outer check 306 symmetrically about the axis A-A'.

The second orifices 314 define a second included angle "β" with respect to the axis A-A'. The second included angle "β" may also be defined as an angle included between the second spray axis Y-Y' and the central axis A-A'. The second included angle "β" is same for both the second orifices 314. In some embodiments, when there may be more than two second orifices 314, all the second orifices 314 may be provided at similar respective included angles. The second included angle "β" may be similar to, or different than the first included angle "α". The present disclosure is not limited by values of the first included angle "α" and the second included angle "β" in any manner. Further, a cross-sectional area of the first orifice 304 may be either equal to, or greater than a cross-sectional area of the second orifice 314.

The outer check 306 has a hollow structure. The fuel injector 124 further includes an inner check 316 provided within the outer check 306. The inner check 316 is disposed within the outer check 306, and is concentric with respect to the outer check 306 about the axis A-A'. The inner check 316 has a substantially cylindrical structure, which tapers towards an end to form a substantially conical structure. The inner check 316 is provided within the outer check 306 such that the inner check 316 may translate along the axis A-A'. The inner check 316 may move between a closed position (as illustrated in FIGS. 3 and 4) and an open position (as illustrated in FIG. 5).

The controller 208 may be operatively coupled with the fuel injector 124 such that the controller 208 may control the movement of the inner check 316 within the outer check 306 between the open position and the closed position. The controller 208 may control the movement of the outer check 306 and the inner check 316 independently of each other. Also, the movement of the outer check 306 and the inner check 316 may be independent of each other. The inner check 316 and the outer check 306 define a second passage 318 disposed concentrically between the inner check 316 and the outer check 306. The second passage 318 may be coupled to one of the fuel source 202 and the oxidant source 204, and one of the fuel or the oxidant respectively may be supplied through the second passage 318. More specifically, the second passage 318 is defined between an inner surface 320 of the outer check 306, and an outer surface 322 of the inner check 316.

FIG. 4 shows the partial sectional view of the fuel injector 124 with the outer check 306 in the open position and the inner check 316 in the closed position. The outer check 306 allows flow of other of the fuel or the oxidant through the first orifices 304 in the open position. The fuel or the oxidant supplied by the fuel source 202 or the oxidant source 204 respectively flows through the first passage 308, and subsequently flows out of the nozzle 302 through the first orifices 304.

Figure 6:
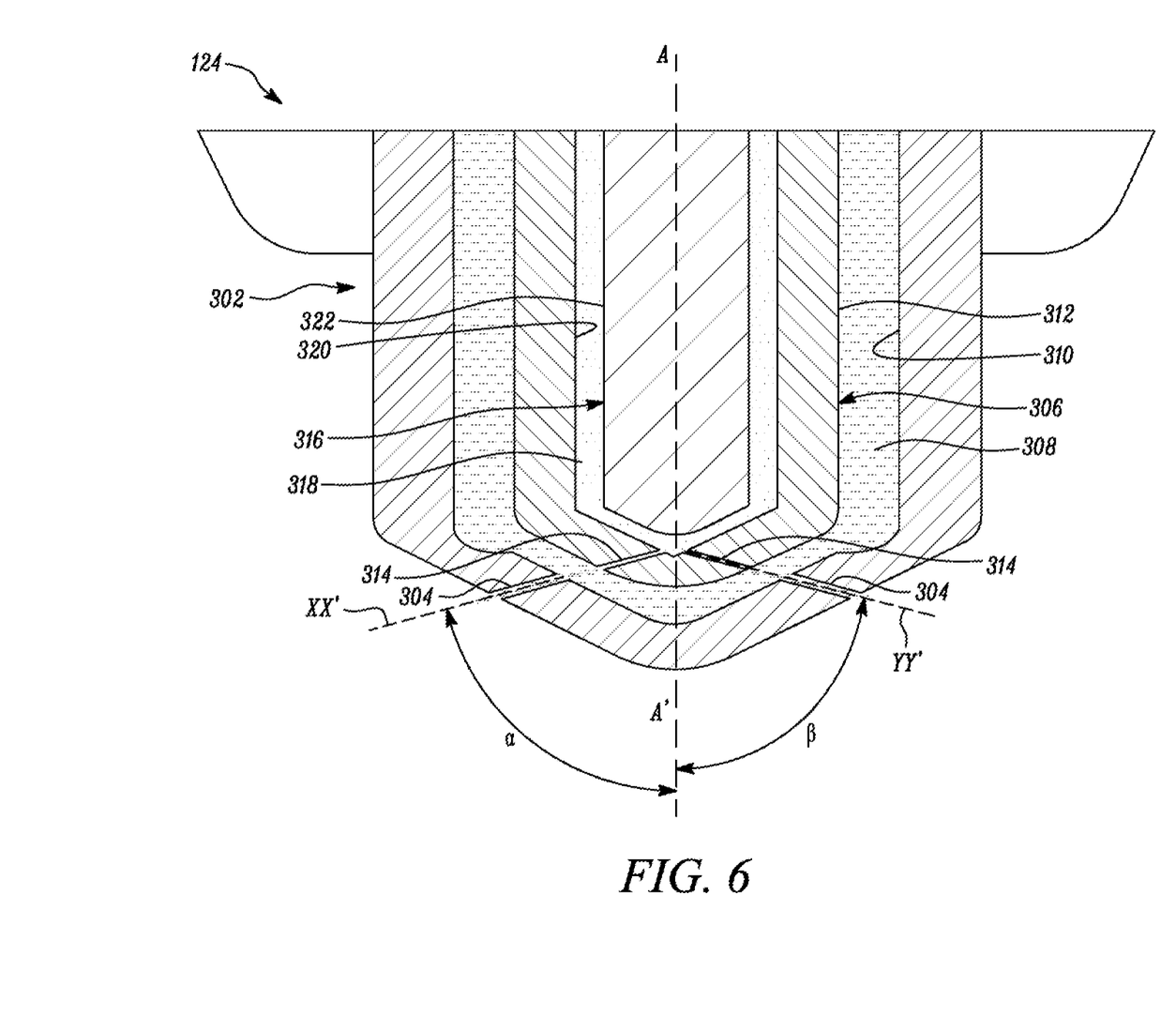
FIG. 6 illustrates a partial sectional view of the injector showing the outer check in open position and the inner check in open position, in accordance with another embodiment of the present disclosure.

FIG. 5 shows the partial sectional view of the fuel injector 124 with both the outer check 306 and the inner check 316 in the open positions. The inner cheek 316 allows flow of other of the fuel or the oxidant out of the outer check 306 through the second orifices 314 in the open position. The other of the fuel or the oxidant flows through the second passage 318, and flows out of the outer check 306 through the second orifices 314. In the embodiment illustrated in FIGS. 3-5, the first passage 308 is coupled with the fuel source 202, and the second passage 318 is coupled with the oxidant source 204. FIG. 6 illustrates another embodiment of the present disclosure. The first passage 308 is coupled with the oxidant source 204, and the second passage 318 is coupled with the fuel source 202. The present disclosure is not limited by a choice of coupling of the fuel source 202 or the oxidant source 204 with any particular one of the first passage 308 and the second passage 318.

INDUSTRIAL APPLICABILITY

The present disclosure provides a method 700 of controlling the fuel injector 124. Various steps of the method 700 are explained with help of a flow chart shown in FIG. 7. At step 702, the fuel injector 124 is provided with the fuel through the fuel source 202. The controller 208 may control supply of the fuel to the fuel injector 124 through the fuel source 202. At step 704, the fuel injector 124 is provided with the oxidant. The controller 208 may control supply of the oxidant to the fuel injector 124 through the oxidant source 204.

Figure 7:
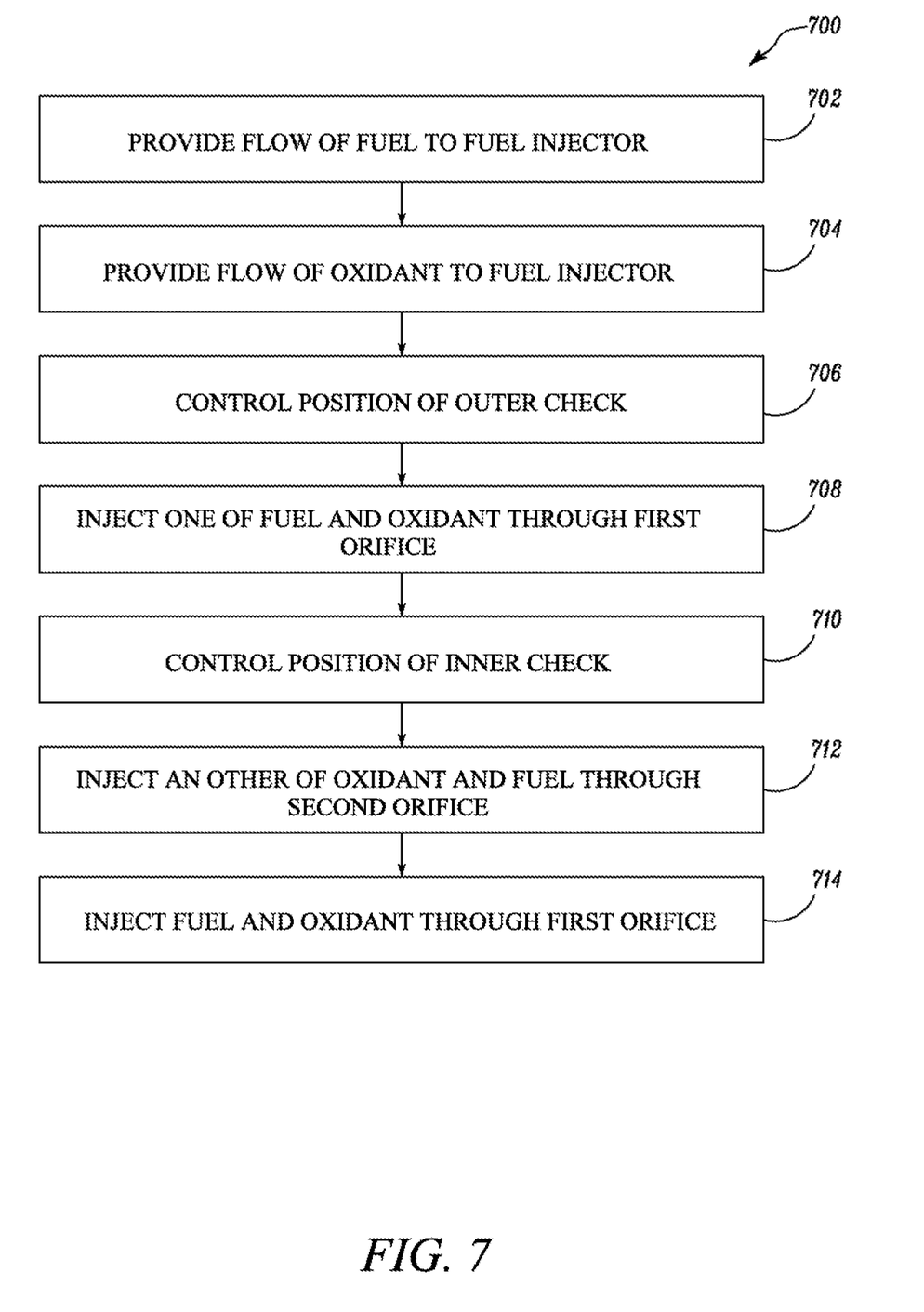
FIG. 7 illustrates a flow chart of a method for controlling the fuel injector in accordance with an embodiment of the fuel injector.

At step 706, the position of the outer check 306 is controlled with respect to the nozzle 302. The controller 208 may control the movement of the outer check 306 within the nozzle 302 between the open position and the closed position. The position of the outer check 306 is controlled by aligning the first orifice 304 with respect to the second orifice 314. At step 708, one of the fuel and the oxidant is injected through the first orifice 304. At step 710, the position of the inner check 316 is controlled with respect to the outer check 306. The controller 208 may control the position of the inner check 316 within the outer check 306. The position of the inner check 316 is controlled with respect to the outer check 306 to limit injection of the other one of the oxidant and the fuel through the second orifice 314. It should be contemplated that the step 706, and step 710 may be performed in any sequential order, based on application requirements. The steps 706 and 710 may also be performed simultaneously, or in any order with respect to each other. The present disclosure is not limited by order of execution of the steps 706 and 710 in any manner.

At step 712, the other one of the oxidant and the fuel is injected through the second orifice 314. When the fuel may be injected through the first orifice 304, then the oxidant may be injected through the second orifice 314. Also, when the oxidant may be injected through the first orifice 304, then the fuel may be injected through the second orifice 314. At step 714, the fuel and the oxidant are injected through the first orifice 304 together. The position of the outer check 306 is controlled with respect to the nozzle 302 to limit injection of one of the fuel, the oxidant, and the fuel and the oxidant together through the at least one first orifice 304. An amount of the fuel and the oxidant being injected may be controlled by controlling duration of injection through the controller 208, such as duration of each of the outer check 306 and the inner check 316 being in the respective open positions and the closed positions.

The fuel injector 124 provided by the present disclosure provides an improved means of injecting the fuel and the oxidant in the combustion chamber 114. For example, in the embodiment when the fuel flows through the first passage 308, and the oxidant flows through the second passage 318, a stream of the oxidant flows through center of a stream of the fuel. Similarly, when the oxidant passes through the first passage 308, and the fuel passes through the second passage 318, the stream of the fuel flows through center of the stream of the oxidant. In both the embodiments, a contact area between the fuel and the oxidant is substantially increased, which results in improving combustion quality of the fuel. Improved combustion quality further results in more complete combustion of the fuel, and thereby lower emissions.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A fuel injector comprising:
    a nozzle including at least one first orifice provided therein, the at least one first orifice configured to selectively inject both of a fuel and an oxidant therethrough;
    an outer check disposed movably longitudinally along a central axis within the nozzle, the outer check including at least one second orifice provided therein, the at least one second orifice configured to selectively inject one of the oxidant and the fuel therethrough; and
    an inner check disposed movably longitudinally along the central axis and concentrically within the outer check,
    wherein the at least one second orifice is adapted to align in spaced alignment with respect to the at least one first orifice to selectively inject the fuel and the oxidant together through the at least one first orifice based on a position of each of the outer check and the inner check,
    wherein the spaced alignment includes an output of the at least one second orifice being spaced from and aligned with an input of the at least one first orifice,
    wherein in a first state the at least one second orifice is in the spaced alignment with the at least one first orifice and the inner check is spaced from the at least one second orifice of the outer check to selectively inject the fuel and the oxidant together through the at least one first orifice, and
    wherein in a second state the at least one second orifice is in the spaced alignment with the at least one first orifice and the inner check blocks the at least one second orifice of the outer check to selectively inject through the at least one first orifice another of the oxidant and the fuel different from said one of the oxidant and the fuel to be selectively injected through the at least one second orifice.

2. The fuel injector of claim 1 further includes a first passage provided between the nozzle and the outer check, the first passage adapted to allow flow of one of the fuel and the oxidant therethrough, the first passage adapted to be selectively connected to the at least one first orifice based on the position of the outer check.

3. The fuel injector of claim 1 further includes a second passage provided between the outer check and the inner check, the second passage adapted to allow flow of one of the oxidant and the fuel therethrough, the second passage adapted to be selectively connected to the at least one second orifice based on the position of the inner check.

4. The fuel injector of claim 1, wherein:
    the fuel is any one of diesel, gasoline, natural gas, and alcohol, and
    the oxidant is at least one of air, oxygen, and an oxidizer.

5. The fuel injector of claim 1, wherein:
    the at least one first orifice is inclined at a first included angle with respect to the central axis; and
    the at least one second orifice is inclined at a second included angle with respect to the central axis, such that the first included angle is equal to the second included angle.

6. The fuel injector of claim 1, wherein:
    the at least one first orifice is inclined at a first included angle with respect to the central axis; and
    the at least one second orifice is inclined at a second included angle with respect to the central axis, such that the first included angle is different with respect to the second included angle.

7. The fuel injector of claim 1, wherein a cross-sectional area of the at least one first orifice is equal or greater with respect to a cross-sectional area of the at least one second orifice.

8. A fuel injection system comprising:
    a fuel source adapted to provide a fuel therefrom;
    an oxidant source adapted to provide an oxidant therefrom;
    a fuel injector provided in fluid communication with each of the fuel source and the oxidant source, the fuel injector comprising:
        a nozzle including at least one first orifice provided therein, the at least one first orifice configured to selectively inject both of the fuel and the oxidant therethrough;
        an outer check disposed movably longitudinally along a central axis within the nozzle, the outer check including at least one second orifice provided therein, the at least one second orifice configured to selectively inject one of the oxidant and the fuel therethrough; and
        an inner check disposed movably longitudinally along the central axis and concentrically within the outer check; and
    a controller communicably coupled to each of the fuel source, the oxidant source, and the fuel injector,
    wherein the at least one second orifice is adapted to align in spaced alignment with respect to the at least one first orifice to selectively inject the fuel and the oxidant together through the at least one first orifice based on positioning of each of the outer check and the inner check, and
    wherein the spaced alignment includes an output of the at least one second orifice being spaced from and aligned with an input of the at least one first orifice such that longitudinal axes of the at least one first orifice and the at least one second orifice are coaxial.

9. The fuel injection system of claim 8, wherein the controller is configured to:
    control flow of the fuel from the fuel source to the fuel injector;
    control flow of the oxidant from the oxidant source to the fuel injector;
    control a position of the outer check;
    control injection of one of the fuel and the oxidant through the at least one first orifice;
    control a position of the inner check;
    control injection of the other of the oxidant and the fuel through the at least one second orifice; and
    control injection of the fuel and the oxidant together through the at least one first orifice.

10. The fuel injection system of claim 8 further includes a first passage provided between the nozzle and the outer check, the first passage adapted to allow flow of one of the fuel and the oxidant therethrough, the first passage adapted to be selectively connected to the at least one first orifice based on the position of the outer check.

11. The fuel injection system of claim 8 further includes a second passage provided between the outer check and the inner check, the second passage adapted to allow flow of one of the oxidant and the fuel therethrough, the second passage adapted to be selectively connected to the at least one second orifice based on the position of the inner check.

12. The fuel injection system of claim 8, wherein:
the fuel is any one of diesel, natural gas, alcohol and gasoline, and
the oxidant is at least one of air, oxygen, and an oxidizer.

13. The fuel injection system of claim 8, wherein:
the at least one first orifice is inclined at a first included angle with respect to the central axis; and
the at least one second orifice is inclined at a second included angle with respect to the central axis, such that the first included angle is equal to the second included angle.

14. The fuel injector of claim 1, wherein:
the at least one first orifice is inclined at a first included angle with respect to the central axis; and
the at least one second orifice is inclined at a second included angle with respect to the central axis, such that the first included angle is different with respect to the second included angle.

15. The fuel injection system of claim 8, wherein a cross-sectional area of the at least one first orifice is equal or greater with respect to a cross-sectional area of the at least one second orifice.

16. A method for controlling a fuel injector, the fuel injector having a nozzle, an outer check, and an inner check, the method comprising:
providing flow of a fuel to the fuel injector;
providing flow of an oxidant to the fuel injector;
controlling a position of the outer check;
injecting one of the fuel and the oxidant through at least one first orifice;
following said injecting one of the fuel and the oxidant through the at least one first orifice, controlling a position of the inner check;
injecting the other of the oxidant and the fuel through at least one second orifice based on said controlling the position of the inner check; and
injecting the fuel and the oxidant together through the at least one first orifice,
wherein said injecting the fuel and the oxidant together through the at least one first orifice includes spaced alignment of the at least one second orifice with the at least one first orifice, and
wherein the spaced alignment includes an output of the at least one second orifice being spaced from and aligned with an input of the at least one first orifice such that longitudinal axes of the at least one first orifice and the at least one second orifice are coaxial.

17. The method of claim 16 further comprising controlling the position of the inner check with respect to the outer check to limit injection of one of the oxidant and the fuel through the at least one second orifice.

18. The method of claim 17 further comprising controlling the position of the outer check with respect to the nozzle to limit injection of one of the fuel and the oxidant through the at least one first orifice.

\* \* \* \* \*